(12) United States Patent
Sthanikam et al.

(10) Patent No.: US 8,745,031 B2
(45) Date of Patent: *Jun. 3, 2014

(54) CACHE-BASED PREDICATE HANDLING FOR QUERIES ON XML DATA USING UNCORRELATED PATH-BASED ROW SOURCES

(75) Inventors: Balasubramanyam Sthanikam, Foster City, CA (US); Sivasankaran Chandrasekar, Menlo Park, CA (US); Sam Idicula, Santa Clara, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 12/474,124

(22) Filed: May 28, 2009

(65) Prior Publication Data
US 2010/0306219 A1    Dec. 2, 2010

(51) Int. Cl.
*G06F 7/00* (2006.01)
*G06F 17/30* (2006.01)

(52) U.S. Cl.
USPC ............. 707/713; 707/716; 706/12; 706/14; 706/19; 706/21

(58) Field of Classification Search
None
See application file for complete search history.

(56) References Cited

U.S. PATENT DOCUMENTS

| 6,609,123 | B1 | 8/2003 | Cazemier et al. | |
| 7,165,063 | B2 | 1/2007 | Beyer et al. | |
| 7,756,858 | B2 * | 7/2010 | Lindblad et al. | 707/716 |
| 7,840,547 | B1 | 11/2010 | Tucker et al. | |
| 7,870,124 | B2 | 1/2011 | Liu et al. | |
| 7,882,089 | B1 * | 2/2011 | Levy | 707/705 |
| 7,921,129 | B2 | 4/2011 | Madan et al. | |
| 8,161,035 | B2 | 4/2012 | Zhang et al. | |
| 8,239,373 | B2 | 8/2012 | Sthanikam et al. | |
| 8,301,620 | B2 | 10/2012 | Sthanikam et al. | |
| 2003/0167258 | A1 | 9/2003 | Koo et al. | |
| 2004/0148420 | A1 * | 7/2004 | Hinshaw et al. | 709/231 |
| 2004/0205082 | A1 * | 10/2004 | Fontoura et al. | 707/101 |
| 2005/0055355 | A1 | 3/2005 | Murthy et al. | |
| 2005/0097084 | A1 | 5/2005 | Balmin et al. | |
| 2005/0108209 | A1 | 5/2005 | Beyer et al. | |
| 2006/0026113 | A1 * | 2/2006 | Omoigui | 706/55 |

(Continued)

OTHER PUBLICATIONS

J. E. Funderburk et al, "XML programming with SQL/XML and XQuery" 2002, IBM Systems Journal vol. 41, pp. 642-665.*

(Continued)

*Primary Examiner* — Angelica Ruiz
(74) *Attorney, Agent, or Firm* — Hickman Palermo Truong Becker Bingham Wong LLP

(57) ABSTRACT

The approaches described herein provide an efficient way to process certain kinds of queries that retrieve XML data stored in an object-relational database. An XML query may include a predicate condition that joins two row sources. One or both of the row sources required for predicate evaluation may be path-based; that is, consume and produce rows of XMLType data. Such a path-based row source may be modified to use the predicate condition to filter the rows it generates so that only rows satisfying the predicate condition need to be further processed. A small cache structure introduced into the path-based row source may be used to optimize the evaluation of the predicate row. Once populated with row data, the cache structure may be reorganized to optimize the performance of predicate evaluation.

22 Claims, 9 Drawing Sheets

(56) References Cited

U.S. PATENT DOCUMENTS

| | | |
|---|---|---|
| 2007/0011184 A1* | 1/2007 | Morris et al. ............... 707/101 |
| 2007/0076936 A1* | 4/2007 | Li et al. ..................... 382/129 |
| 2007/0130110 A1* | 6/2007 | Graefe et al. .................. 707/2 |
| 2007/0162426 A1 | 7/2007 | Brown et al. |
| 2007/0168324 A1 | 7/2007 | Grabs et al. |
| 2007/0233645 A1 | 10/2007 | Peterson et al. |
| 2007/0276825 A1 | 11/2007 | Dettinger et al. |
| 2007/0276835 A1 | 11/2007 | Murthy |
| 2007/0299834 A1 | 12/2007 | Liu et al. |
| 2008/0065674 A1 | 3/2008 | Liu et al. |
| 2008/0114803 A1 | 5/2008 | Chinchwadkar et al. |
| 2008/0120283 A1* | 5/2008 | Liu et al. ....................... 707/4 |
| 2008/0162442 A1 | 7/2008 | Agarwal |
| 2008/0172353 A1 | 7/2008 | Lim et al. |
| 2008/0222101 A1 | 9/2008 | Beyer et al. |
| 2008/0222123 A1 | 9/2008 | Colby et al. |
| 2009/0070313 A1 | 3/2009 | Beyer et al. |
| 2009/0100004 A1* | 4/2009 | Andrei et al. ................... 707/2 |
| 2009/0125480 A1 | 5/2009 | Zhang et al. |
| 2009/0210383 A1 | 8/2009 | Seemann |
| 2009/0259641 A1 | 10/2009 | Balmin et al. |
| 2009/0287670 A1 | 11/2009 | Hou et al. |
| 2010/0293199 A1 | 11/2010 | Sthanikam et al. |
| 2010/0299327 A1 | 11/2010 | Kiefer et al. |
| 2010/0306220 A1 | 12/2010 | Sthanikam et al. |
| 2010/0312756 A1 | 12/2010 | Zhang et al. |
| 2013/0159278 A1 | 6/2013 | Liu |

OTHER PUBLICATIONS

Hemel et al., "Code Generation by Model Transformation, A case Study in Transformation Modularity," Theory and Practice of Model Transformations Lecture Notes in Computer Science, 2008, vol. 5063/2008, pp. 183-198.

Zhang et al., "Honey, I Shrunk the XQuery!—An XML Algebra Optimization Approach," WIDM '02, Nov. 8, 2002, ACM, pp. 15-22.

U.S. Appl. No. 12/478,147, filed Jun. 4, 2009, Notice of Allowance, Dec. 14, 2011.

U.S. Appl. No. 12/474,133, filed May 28, 2009, Final Office Action, Dec. 16, 2011.

U.S. Appl. No. 12/467,984, filed May 18, 2009, Notice of Allowance, mailed Mar. 29, 2012.

U.S. Appl. No. 12/474,133, filed May 28, 2009, Notice of Allowance, mailed Jun. 22, 2012.

U.S. Appl. No. 12/330,622, filed Dec. 19, 2011, Final Office Action, mailed May 22, 2013.

* cited by examiner

```
<auction>
    <site>                110
        <people>  ↓
            <person id=12345>
                <name> person1 </name>
            </person>
            <person id=23456>
                <name>person2 </name>
            </person>
            ...
        </people>
        <closed_auctions>
            <closed_auction>
                <buyer person=12345/>
            </closed_auction>
            <closed_auction>
                <buyer person=12345/>
            </closed_auction>
            <closed_auction>
                <buyer person=23456/>
            </closed_auction>
            ...
        </closed_auctions>
    </site>
</auction>
```

100

150

```
for $p in $auction/site/people/person ——160
let $a :=                                    170
    for $t in $auction/site/closed_auctions/closed_auction
    where $t/buyer/@person = $p/@id
    return $t
return <item person="{$p/name/text()}">{count($a)}</item>'
```

FIG. 1

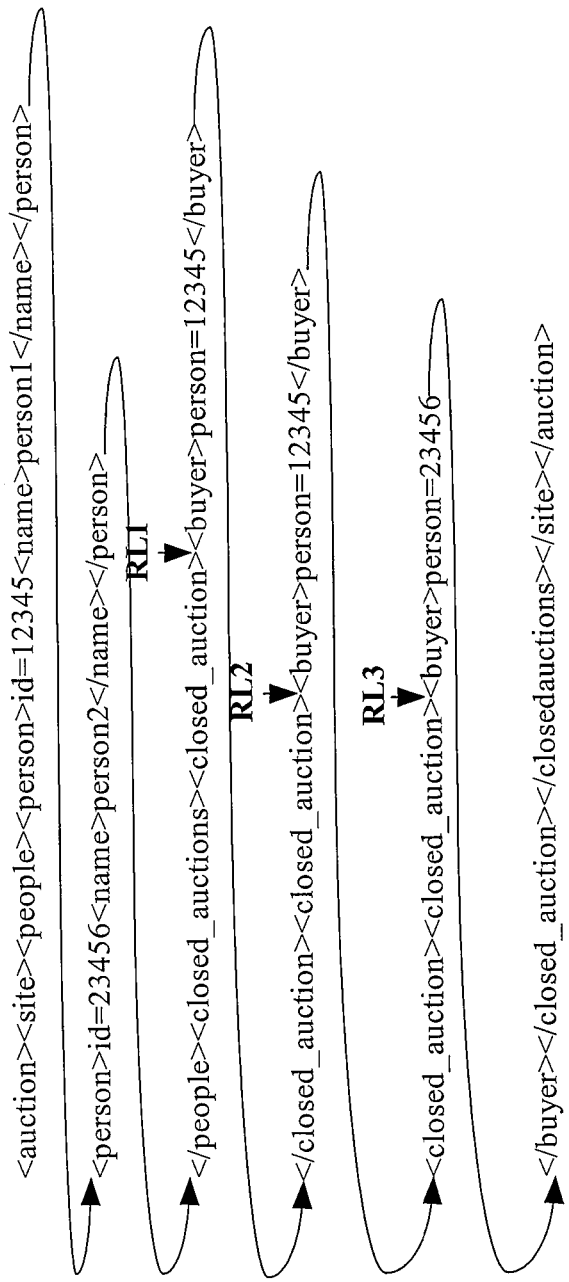
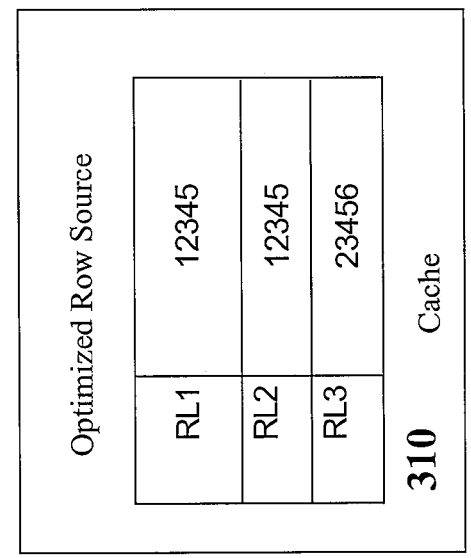
FIG. 3

CACHE-BASED PREDICATE HANDLING FOR QUERIES ON XML DATA USING UNCORRELATED PATH-BASED ROW SOURCES

CROSS-REFERENCE TO RELATED APPLICATIONS; BENEFIT CLAIM

This application is related to U.S. patent application Ser. No. 11/182,997 filed on Jul. 14, 2005, entitled "Encoding Of Hierarchically Organized Data For Efficient Storage And Processing;" U.S. patent application Ser. No. 12/467,984 filed on May 18, 2009, entitled "Efficient Way To Evaluate Uncorrelated Path-Based Row Sources With XML Storage;" and U.S. patent application Ser. No. 12/474,133 filed on May 28, 2009 entitled "Efficient Way To Evaluate Aggregations On XML Data Using Path-Based Row Sources." The contents of all patent applications cited in this paragraph are incorporated by reference.

This application is also related to U.S. patent application Ser. No. 12/478,147 filed on Jun. 4, 2009, entitled "Query Optimization By Specifying Path-Based Predicate Evaluation In A Path-Based Query Operator."

FIELD OF THE INVENTION

The techniques presented herein are directed towards storing XML data in a relational database, and querying the data in an efficient way.

BACKGROUND

XML Documents

XML (extensible Markup Language) is becoming increasingly popular as the format for describing and storing all forms of data. Thus, providing support for storing, searching, and manipulating XML documents is an extremely important problem for data management systems today.

Because of the popularity of XML as a data exchange format that supports hierarchical relationships among elements, and because of the power of relational data management systems (DBMS) to update and retrieve data, there is a demand for storing XML data into relational databases and querying XML data from relational databases using native XML query constructs.

Querying XML Data Store in an Object-Relational Database

When XML data is stored in an object-relational database, there are several choices about how the XML data is stored and how users express queries to retrieve the data. Users often find it convenient to use XQuery expressions to query for XML data, relying on the database management system to translate the XQuery expressions into SQL statements that are optimized for the database system. XQuery 1.0 was developed by the XML Query working group of the W3C, and became a W3C recommendation in Jan. 2007. The translation from XQuery to SQL and the optimization of the SQL depends on several factors including the nature of the XQuery and how the XML data is stored in the database.

XPath Expressions

XPath is a language for addressing XML documents that operates on the abstract, logical structure of an XML document, rather than its surface syntax. XPath gets its name from its use of a path notation, as in URLs, for navigating through the hierarchical structure of an XML document. The XPath data model is described in detail in Section 5 ("Data Model") of "XML Path Language (XPath)" (version 1.0), a W3C (World Wide Web Consortium) Recommendation dated 16 Nov. 1999.

The primary syntactic construct in XPath is the expression. XPath expressions are described in Section 3 ("Expressions") of "XML Path Language (XPath)" (version 1.0). One important kind of expression is a location path which indicates a set of nodes relative to a context node. The semantics of location paths are described in Section 2 ("Location Paths") of "XML Path Language (XPath)" (version 1.0).

XPath is a subset of XQuery. That is, an XPath expression is also an XQuery expression. However, XQuery also has programming constructs in addition to XPath expressions.

Binary XML

The size of individual XML documents has been growing. XML documents can be as large as multi-megabytes and are expected to grow significantly over time. Binary XML is a compact binary representation of XML that was designed to reduce the size of XML documents, and is one format in which XML data can be stored in a database. Binary XML reduces the overall size of the XML document. In addition, sending a binary-encoded XML document over the network requires fewer bytes to be transmitted, thus consuming less network bandwidth.

However, Binary XML requires more processing time to query and manipulate. The binary encoding must be decoded in order to interpret the document. Thus, each time an XPath expression is evaluated over binary XML, additional computation is necessary over what would be required when simply operating on an in-memory tree-representation or even a textual representation of the document. Techniques are needed to increase the performance of querying binary-encoded XML data stored in an object-relational database while keeping the benefits that the database management system provides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is an example XML document and an example XQuery expression that takes the XML document as input.

FIG. 3 is a diagram showing streaming evaluation of XML data and a cache of reference locators pointing into the XML data.

DETAILED DESCRIPTION

Figure 2:
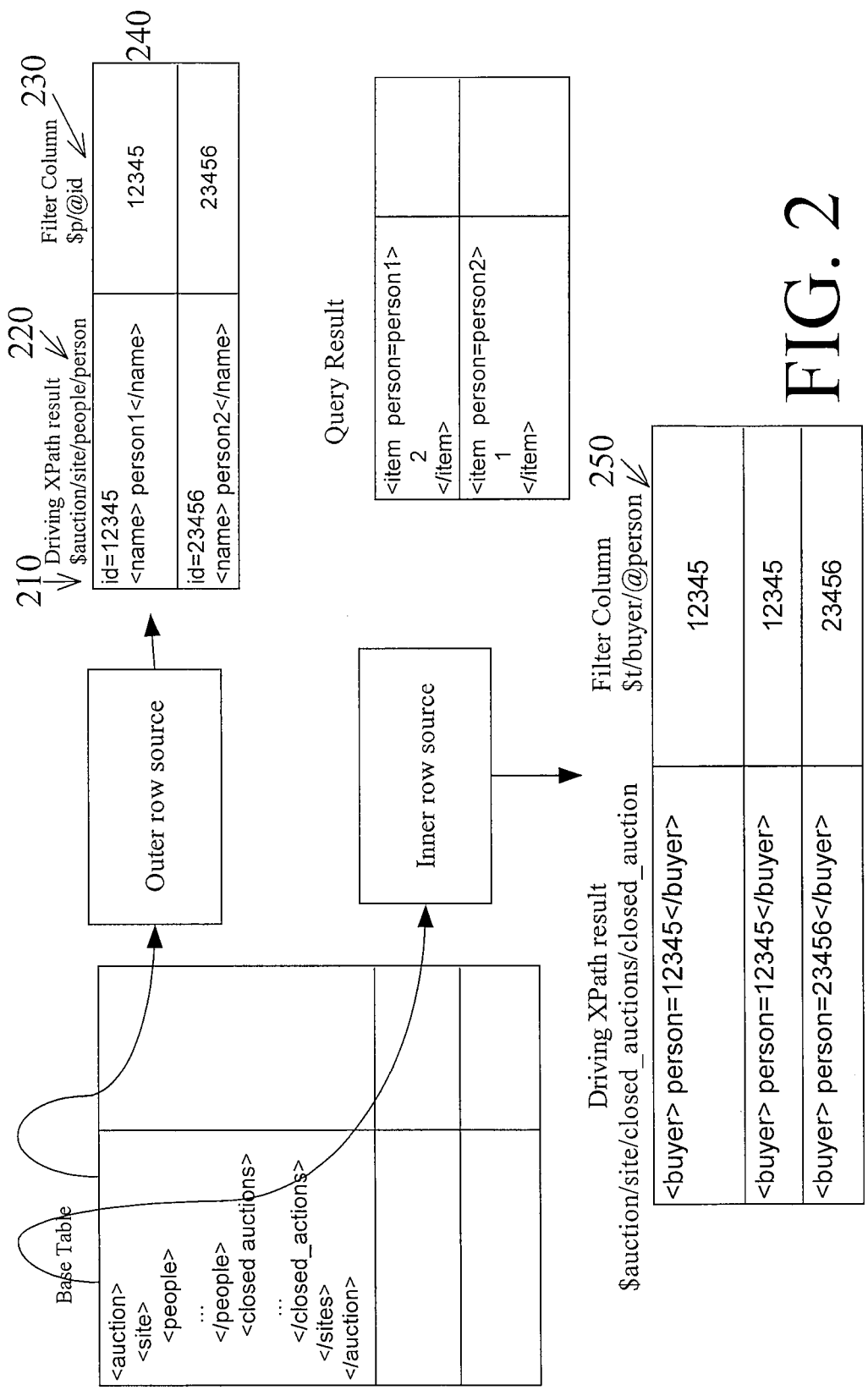
FIG. 2 is a diagram showing the input and outputs for the inner and outer path-based row sources.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

The approaches described herein provide an efficient way for a database server to process certain kinds of queries that retrieve XML data stored in an object-relational database. A database server may use these techniques to determine whether a query comprises a plurality of iteration expressions that exhibit a particular relationship to one another, and if so, to re-write the query and produce an optimized query execution plan. The query execution plan specifies an XPath-based row source with caching enabled. A very small cache structure is used, and resource locators are stored in the cache that point into binary-encoded data rather than copying XMLType data into the cache. Row data may be cached on the first use of the path-based row source and re-used in subsequent requests for rows. Once there is a subsequent request for rows from the optimized path-based row source, the cache may be reorganized to efficiently produce the rows of the path-based row source.

Furthermore, a row predicate condition, that joins the output of another row source with the optimized row source, may be evaluated within the optimized path-based row source. The cache may be tuned to optimize predicate evaluation.

XQuery

XQuery is used to query collections of XML data. XQuery is semantically similar to SQL. The SQL/XML committee has decided to accept the XQuery data model for the XML-Type data type. When XML data is stored in a database, a user may retrieve the XML data by writing XQuery expressions.

XQuery uses XPath expression syntax to address specific parts of an XML document. XQuery supplements the XPath expression syntax with SQL-like "FLWOR expressions." A FLWOR expression is constructed from the five clauses after which it is named: FOR, LET, WHERE, ORDER BY, RETURN. The FOR clause is a looping construct as in many programming languages and provides the ability to iterate over a set of operations. FOR clauses may be nested; that is, one FOR clause may be located within another FOR clause.

All iterations of an inner XQuery FOR expression are evaluated for each iteration of the outer FOR expression. Thus, if there are m iterations of the outer loop and n iterations of the inner loop, each expression in the inner loop will be evaluated m×n times. Evaluating an XPath expression on Binary XML can be very expensive. Thus, minimizing the number of times an XPath expression must be evaluated can lead to performance optimization.

XQuery Example

FIG. 1 shows an example XQuery expression 150 that operates on the XML Document, 100. The entire document 100 is stored as Binary XML in an XMLType column of an object-relational database table. This relational table is called the "base table" for the XQuery. Document 100 describes the results of an auction, and records a list of bidders who participated in the auction and the list of closed auctions containing information including which bidder won the auction. The XQuery expression, 150, returns one row for each person, with each row containing the number of auctions the person won.

The XQuery expression, 150, has an outer FOR loop 160 (more generally referred to as an "iteration expression") that iterates over the person elements and an inner FOR loop 170 that iterates over the closed_auctions. For each person, each closed auction is inspected to determine whether the current person was the winner. If the person of the current iteration won the closed auction of the current iteration, then the person's count is incremented. The inner loop performs streaming analysis of the binary-encoded XML data to create a set of closed_auction XML fragments before the comparison can be made to determine whether the person won the auction. All iterations of the inner loop are performed for each person element. Furthermore, each time the inner loop is computed, the resulting XML fragments are the same for all iterations over person elements. In other words, the outcome of the inner loop does not depend on which person's auctions are being counted. The inner and the outer loops operate on the same data and are independent of one another.

The XQuery operates on the entire auction document represented by 100, which is stored in a column of the base table. The iteration of the outer loop, 160, looks at all instances of "closed_auction/buyer/person" relative to the XPath expression "$auction/site/people/person." Sometimes an inner loop operates on input that is produced by the outer loop. However, in this example, the inner loop 170 depends on the same auction document 100 as the outer loop 160 (the same base table column). Thus, the inner and outer loops are independent of one another because the inner loop does not depend on the output from the outer loop.

Query Rewrite and Optimization

When a database system receives an XQuery expression for retrieving XML data stored within the database, the database system performs a series of steps of translation, rewriting, and optimization before executing the query. Each step of query transformation may result in a re-formed text-based representation of the query. Alternatively, the database system may represent the transformed query as in-memory data structures at one or more steps of query transformation.

The next sections describe query transformations that are relevant to the techniques described herein.

XQuery to SQL Translation

An XQuery expression is re-written in terms of XML-aware SQL constructs before the expression can be computed. Relational databases operate on rows and columns, and thus, XQuery expressions must be translated into SQL operations that can operate on binary encoded XML data and create a row comprising columns of XMLType data and scalar values.

Each XQuery FLOWR expression is re-written as an XML-aware query operator, such as the XPATHTABLE query operator used by Oracle. The XML-aware query operator specifies the driving XPath expression whose evaluation will determine the cardinality and contents of a set of rows. Each result of the driving XPath expression evaluation will create one row. The XML-aware query operator will also specify an XPath expression corresponding to each of the columns in the row. To generate the value of a column, the XPath expression corresponding to the column is evaluated on the results from evaluating the driving XPath expression for this row.

Continuing the XQuery example shown above, two XML-aware query operators are generated at XQuery rewrite time. The first query operator corresponds to the XQuery FLOWR expression 160 and the other corresponds to 170. Here is a simplified example of XML-aware SQL generated for the XQuery example using the query operator XPATHTABLE to specify the rows and columns of XML data to be generated in the query:

```
SELECT
  (SELECT ... FROM XPATHTABLE(xmlnamespaces('xmark.xsd'
  as "xm"), '/xm:site/closed_auctions/closed_auction'
                ...
            COLUMNS c0 XMLTYPE PATH '.',
                    C1 VARCHAR2(4000) PATH
                        '/closed_auction/buyer/
                         @person'
            )
  ) P1
    WHERE P.c2 = P1.c1)
FROM XPATHTABLE(xmlnamespaces('xmark.xsd' as "xm"),'
                '/xm:site/people/person'
                ...
            COLUMNS c0 XMLTYPE PATH '.',
                    C1 VARCHAR2(4000) PATH
                        'person/name/text( )',
                    C2 VARCHAR2(4000) PATH
                        'person/@id( )'
  ) P
) ret
from xmark_cxs x;
```

The XPATHTABLE query operator corresponding to 160 specifies a driving XPath expression of "$auction/site/people/person" and additional columns computed by "$auction/site/people/person/@id" and "$auction/site/people/person/name/text( )." The query operator corresponding to 170 specifies a driving XPath expression of "$auction/site/closed_auctions/closed_auction" with an additional column computed by "$auction/site/closed_auctions/closed_auction/buyer/@person."

SQL Query Rewrite

Once an XQuery expression is re-written into XML-aware SQL constructs, a database server optimizes the query and generates an execution plan. Optimization may require analysis of the relationships among the XML-aware query operators to determine their interdependency. In one embodiment, recognizing that an optimization is possible requires evaluating two criteria. The first criteria is whether for each individual row of output specified by a first query operator, all rows specified by a second query operator have to be generated. The second criterion is whether the query operators are uncorrelated. Uncorrelated means that neither of the query operators depends on output from the other. Uncorrelated query operators may be evaluated independently because one does not depend on the other for its input. The optimization described herein may be performed upon recognizing that both criteria are met.

In the example query, the two XML query operators specify row generators that are uncorrelated because the driving XPath for each operates on the base XML Table column as input. Furthermore, the XML query operator corresponding to 170 must be evaluated for each result generated in 160. Thus, the optimization described below may be performed on the example query because both criteria are met.

XPath Row Source

The outcome of query optimization is a query execution plan. The query execution plan provides the instructions to the SQL engine as to the sequence of function calls and their parameters. For example, each of the XML-aware query operators described above will be used in the construction of the query execution plan to parameterize a function that the SQL engine will invoke at run time. When the query meets the specific criteria for optimization as described above, then an XPath row source can be invoked to perform run-time optimization.

A row source is a function which, when invoked by the SQL engine, produces a set of rows. A path-based row source is a row source that produces rows, with each row having a number of columns and each column generated by evaluating one or more path expressions such as XPath. (An XPath row source is a path-based row source that evaluates XPath expressions). A path-based row source generates a row containing XMLType data and can operate on XML data, and in particular, binary-encoded XML data.

An XML-aware query operator at least partially specifies the parameters to an XPath row source. An example of an XPath row source is Oracle's XPATHTABLE row source. Oracle's XPATHTABLE query operator is an SQL language construct that is used as an intermediate result during query evaluation. The query operators specify some of the information that will be used when parameterizing the XPath row source, which is a run-time function. The XPath row source is included in the query execution plan.

The XPath row source uses Binary XML locators internally to store results of XPath evaluation. A locator may be a reference or pointer to a location in the document containing the results of the XPath query.

At query execution time, the SQL Engine invokes an XPath row source to obtain a set of rows. The XPath row source evaluates its driving XPath, operating on its XMLType base column. The XPath row source may use streaming evaluation rather than constructing an entire XML document in memory. If the XML data is binary-encoded, the data is decoded as the data is streamed. In the example, executing the first iteration of the FOR loop 170 comprises the XPath row source finding the first <closed_auction> element and generating a row that includes the value of the person attribute (i.e. "12345") in the buyer element.

For one document in the database, the XPath row source may produce multiple rows. (See FIG. 2) Computing the XPath "$auction/site/people/person" over the base table column will result in one row for each person element 210 in the document. The first row is based on the results obtained the first time the driving XPath expression 220, associated with the outer row source, is computed. The next row will be based on the results obtained the next time the driving XPath expression is computed. The purpose of XPath row source is to facilitate a fast way to evaluate one or more XPaths on documents stored in a database, and since XPath row source produces rows, relational SQL expressions work very well with XPath row source.

Caching Optimization

Upon recognizing the opportunity to optimize, an XPath row source that must produce all rows for each row generated by another XPath row source may be enabled for caching its row data for reuse in subsequent row requests.

To minimize the consumption of resources (both time and memory space), the cache should be relatively small. Rather than copying XML data into the cache (either binary or text), reference locators are stored. (See FIG. 3) A reference locator (RL) is a pointer that stores the position within the XML data where streaming evaluation will continue when the data is needed. For example, if the XPath expression '$auction/site/closed_auctions/closed_auction' is computed, rather than storing the list of closed_auction elements, a pointer (RL1) to the first closed_auction element in the list is stored in the cache. Locators are much smaller to store than the XML data itself. 310 shows a picture of a cache within the optimized row source that contains reference locators RL1, RL2, and RL3 corresponding to each of the closed_auction elements.

After the cache is loaded with the results of evaluating the XPath row source, the cache is ready to be used for lookup. The first time a cache lookup is performed, the cache may be re-organized to enhance performance. Any data structure may be used for reorganizing the cache including a sorted buffer or creating a hash table as an index.

Keeping the cache small is very important for database performance. The user may set tuning parameters that limit the size of the cache. When the cache grows above the limit, the database may write parts of the cache into temporary tables in the database.

Predicate Evaluation (Row Filtering)

When executing a query expression, a row predicate condition (shortened to "predicate") is evaluated, and a row will only be emitted if the row predicate condition is satisfied (the predicate evaluates to true). Thus, the predicate is used to filter the rows that are generated. When a query expression is computed using more than one row source, the predicate may comprise operands from two different row sources as seen in FIG. 2. In the example predicate, "where $t/buyer/@person=$p/@id," $t/buyer/@person is generated as a column by row source 250, and $p/@id is generated as a column by row source 230. These columns are called filter columns because their role in predicate evaluation is to filter the rows that are generated from the query. The value in the filter column for each row is called a filter operand. In other words, the value computed when evaluating the XPath expression $t/buyer/@person is the value of the filter operand for the filter column of rows generated by row source 250. A locator to the position within the XML document where the XML fragment "12345" is located may be placed as the value of the filter column of the row source output. Alternatively, the value "12345" itself may be placed in the filter column of the row 240 that is generated.

Figure 4:
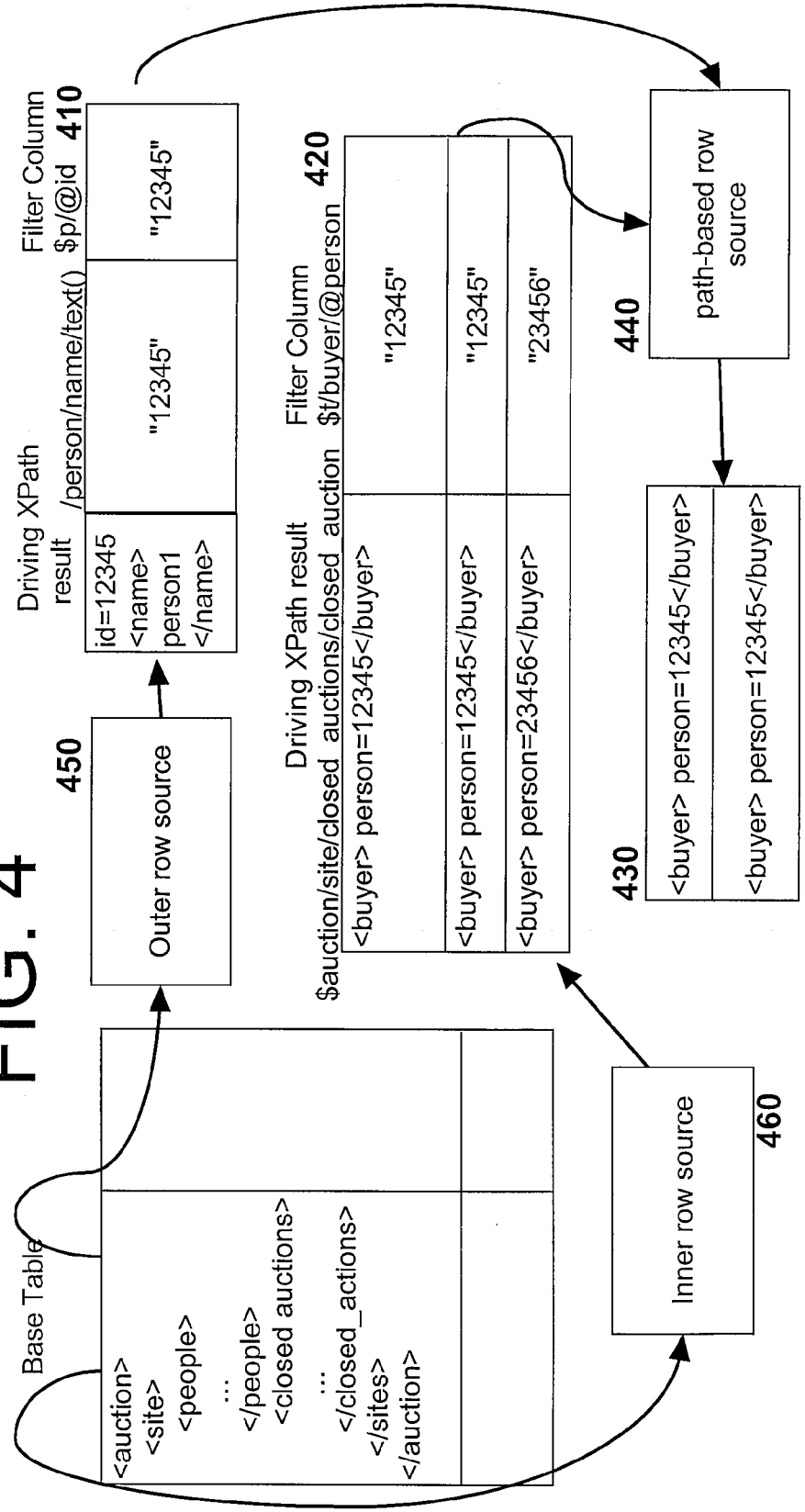
FIG. 4 is a diagram showing a row source using the rows generated by the inner and outer path-based row sources.

FIG. 4 shows the computation for the first row 410 generated by row source 450. All rows 420 of inner row source 460 are generated. A path-based row source 440 filters the rows generated by row source 460 by evaluating the row predicate condition. The resulting filtered rows are shown in 430.

Another row source will apply the count aggregation and generate a row for each person where the row data includes the count of how many auctions the person has won (not shown).

Figure 5:
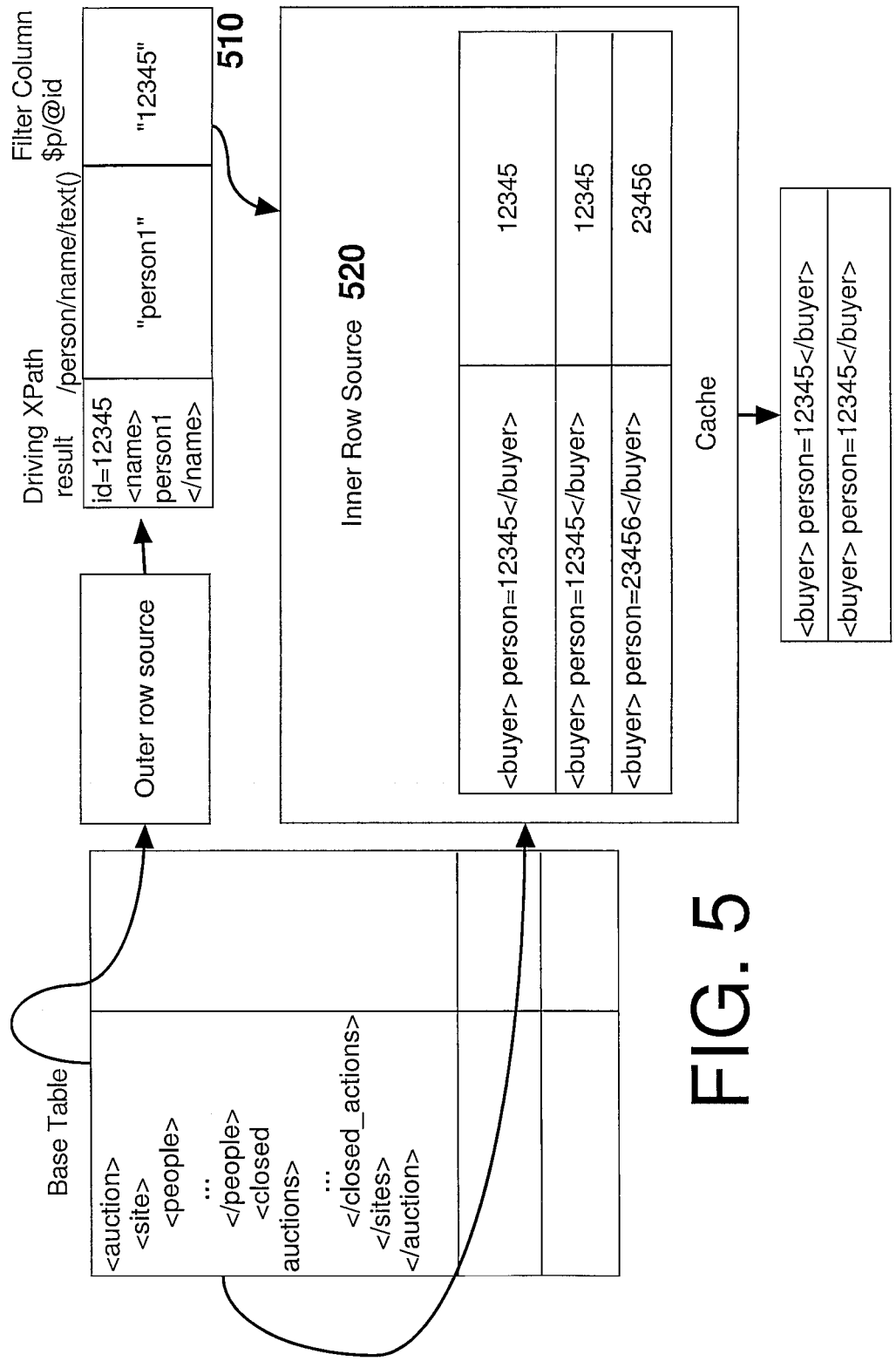
FIG. 5 is a diagram showing a cache of row data maintained within the inner row source.

Query execution can be optimized by computing the row predicate condition inside one of the path-based row sources, as shown in FIG. 5. When an XPath row source is enabled to perform predicate evaluation, the attribute or element value of the filter column may be evaluated and cached as well. Because predicate evaluation will be performed based on that value, it is more efficient to compute once, cache the scalar value, and re-use the value for each predicate evaluation rather than caching a reference locator for the filter column element, and computing the attribute or element value as part of predicate evaluation.

The optimized path-based row source receives as input the predicate information, including the predicate operator and the predicate operand 510 from the other row source. When predicate evaluation is performed inside a row source, only rows satisfying the row predicate condition are generated. Row source 520 caches all the row data, but only generates the rows that pass through the filter. This eliminates the need for the additional path-based row source such as 440 to perform this function.

There are at least two benefits to performing the predicate evaluation inside the second XPath row source. First, only those rows for which the predicate is satisfied are generated by the optimized XPath row source, thus reducing the number of path-based row sources that the SQL engine must invoke. Second, the cache can be reorganized based on the filter column of the optimized XPath row source, and thus the cache lookup can be optimized for performing the predicate evaluation, making the evaluation more efficient within the XPath row source than outside of it.

Preferred Embodiment

Figure 6:
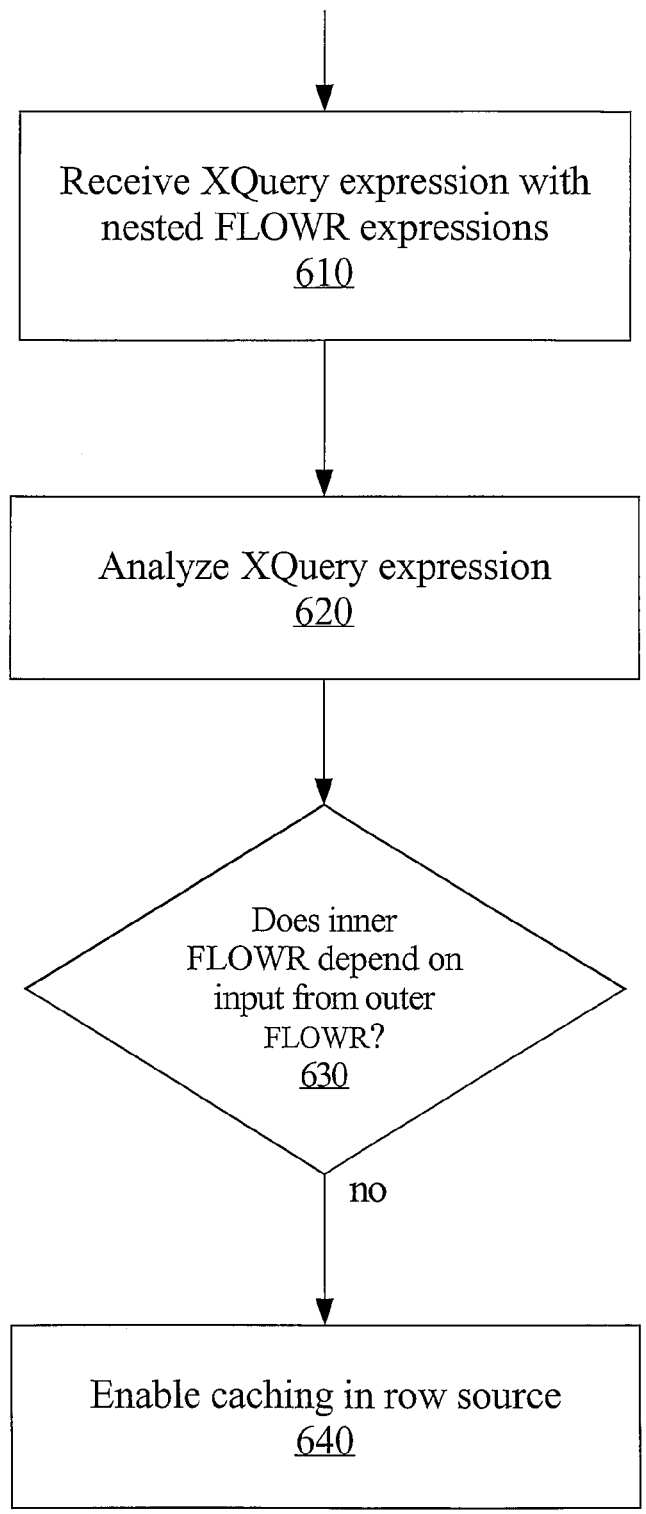
FIG. 6 is a flow diagram showing the analysis of an XQuery expression with nested FOR loops to determine whether to enable a cache.
Figure 7:
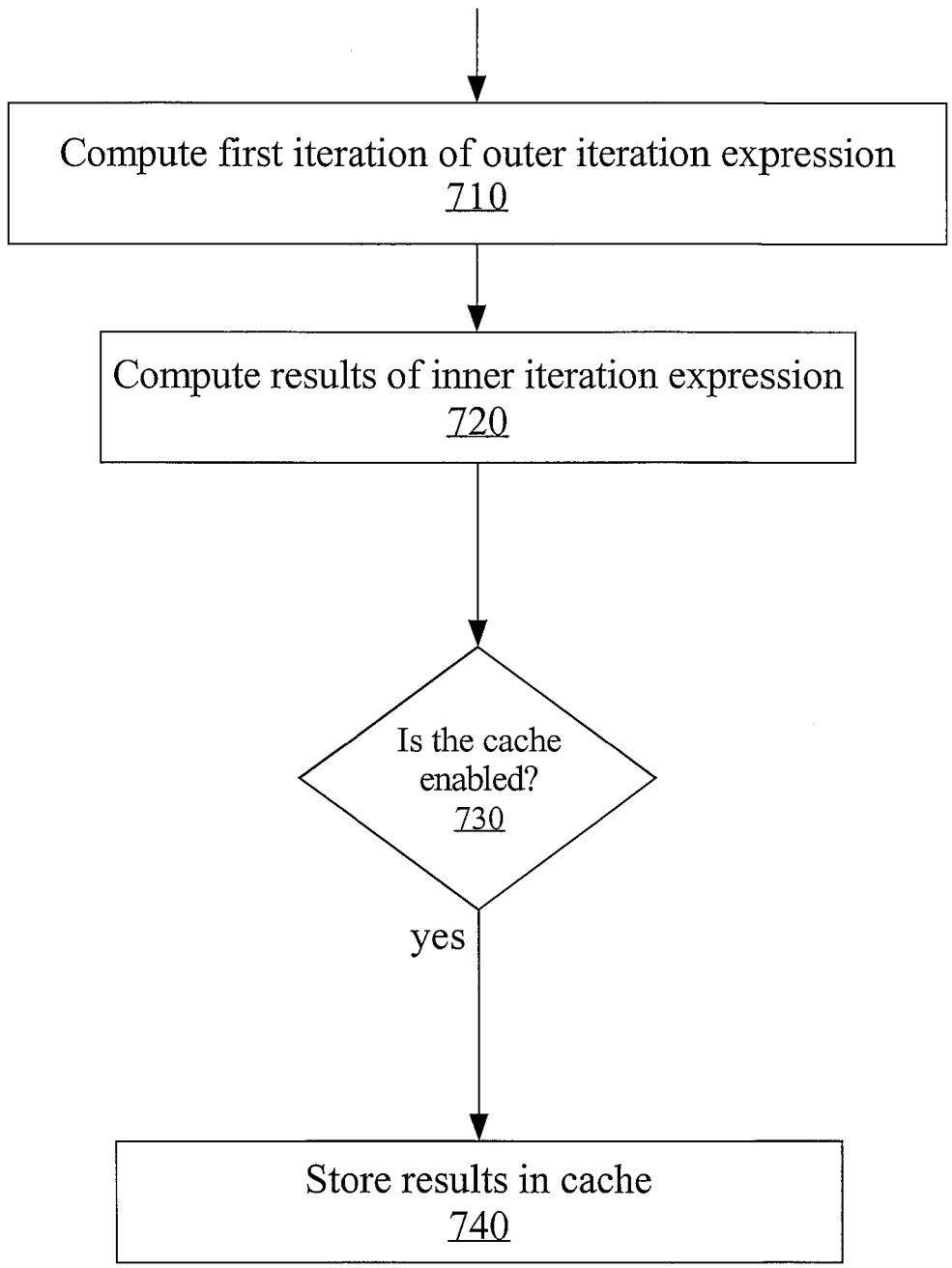
FIG. 7 is a flow diagram showing the steps for storing results from the inner FOR loop in the cache.
Figure 8:
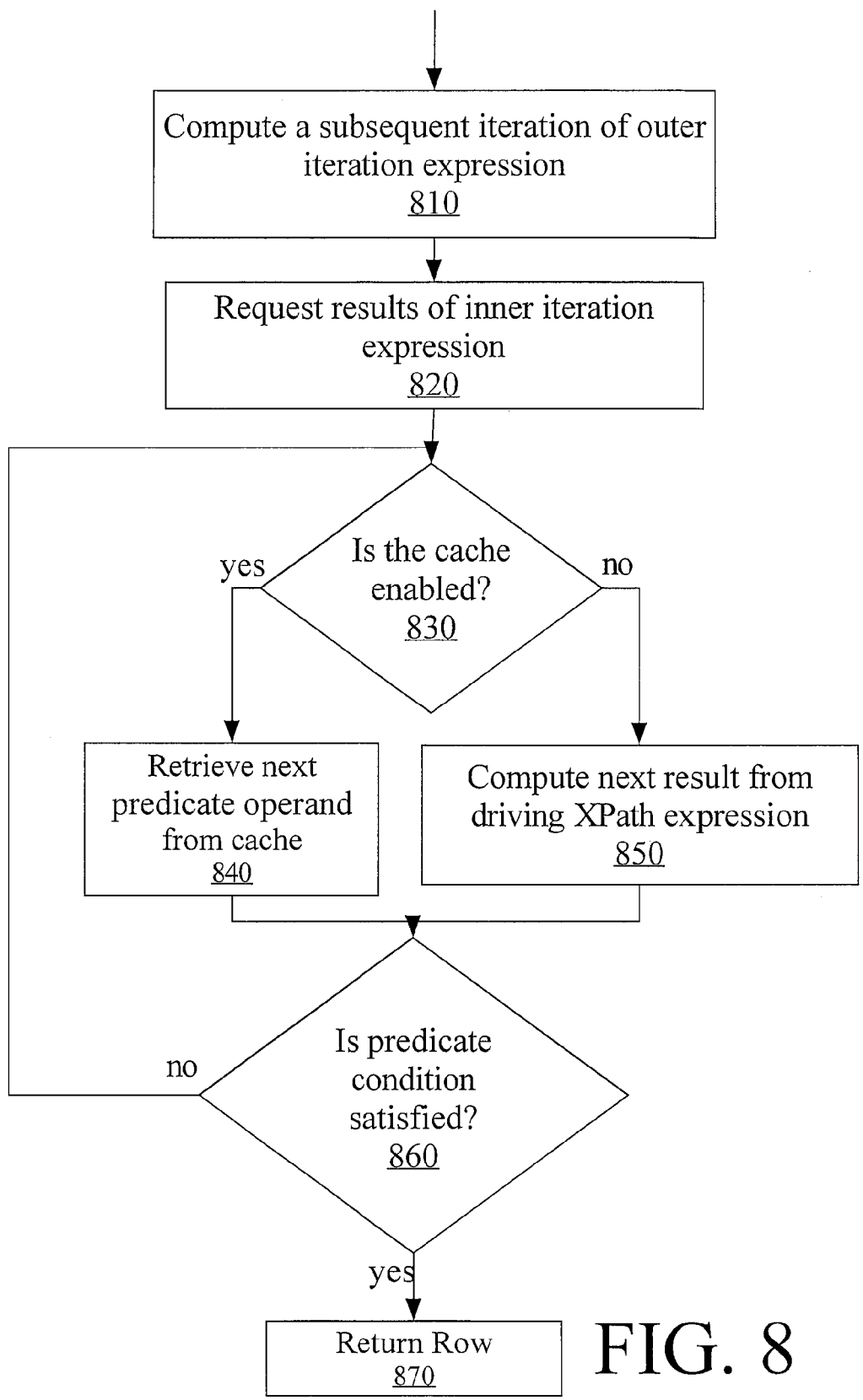
FIG. 8 is a flow diagram showing the steps for retrieving information from the cache for computing an iteration of the outer FOR loop.

FIGS. 6, 7, and 8 show the steps for an embodiment of the techniques described herein. FIG. 6 shows the steps during query compilation for recognizing that a cache can be used to optimize an XQuery expression received with nested FLOWR expressions as seen in Step 610. The XQuery expression is analyzed in Step 620. As a result of the analysis, a determination is made regarding whether the inner FLOWR expression depends on input that is generated by the outer FLOWR expression in Step 630. If there is no such dependency, then in Step 640, the cache is enabled in a path-based row source that will generate rows of XML data corresponding to the inner FLOWR expression.

FIGS. 7 and 8 show steps that are performed during query execution. FIG. 7 shows the flow for loading the cache within the path-based row source. The row source associated with the outer iteration expression ("outer row source") generates the first row in Step 710. The row source associated with the inner iteration expression generates all rows (Step 720). The first time data is requested from the inner row source, the results are computed. When the cache is enabled in the row source (Step 730), the results will also be stored in the cache. (Step 740). Once the first row of the outer row source has been generated, the cache in the inner iteration expression ("inner row source") is completely populated.

FIG. 8 is a flow diagram showing an inner row source retrieving values from the cache instead of computing the same values for each iteration of the outer loop. Having already processed a row from the outer row source, in Step 810 the outer row source generates a subsequent row. The row source associated with the inner iteration expression (Step 820) generates all rows. If the cache is enabled (Step 830), row data is retrieved from the cache, bypassing streaming XPath evaluation (Step 840). If the cache is not enabled in the row source, the results are computed by performing streaming XPath evaluation and without using the cache (Step 850). Once a row is generated from the inner row source, the predicate is evaluated (Step 860). If the predicate is satisfied, then the row is emitted by the inner row source (Step 870).

Other Embodiments

As described above, the preferred embodiment is to analyze the internal representation of the XML-aware SQL constructs after rewriting XQuery and XMLTABLE constructs into XPath query operators, to determine whether these cache-based optimizations can be performed. However, the analysis techniques described herein for identifying the optimization criteria can also be applied directly to the XQuery or XMLTABLE expressions during query re-writing process. In other words, the opportunity to optimize can be detected directly based on analyzing the XQuery or XMLTABLE syntax directly without rewriting the XQuery or XMLTABLE constructs into SQL first.

The preferred embodiment of the cache is to store very small reference locators into binary XML; however, any data structure may be used to store the cache, and any form of pre-processed XPath expressions may be stored for later use.

Although the example XQuery provided is described in terms of a single nested loop, the technique may be used for any number of nested loops. In addition, a nesting relationship is not required among row sources to meet the conditions for optimization. Other relationships, such as a join, may involve multiple row sources that satisfy the optimization criteria.

Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. A language for expressing the database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of the resources from a node is a server that is referred to herein as a "server instance" or "instance".

XML Storage

Various types of storage mechanisms are used to store a XML document. One type of storage mechanism stores a XML document as a text file in a file system. Another type of mechanism for storing XML documents is a database server. In a database server, a XML document may be stored in a row of a table and nodes of the XML document are stored in separate columns in the row. An entire XML document may also be stored in a lob (large object) in a column. A XML document may also be stored as a hierarchy of objects in a database; each object is an instance of an object class and stores one or more elements of a XML document. Tables and/or objects of a database system that hold XML data are referred to herein as base tables or objects.

Binary-encoded XML is another form in which XML data may be stored in a database. Binary-encoded XML is a compact binary representation of XML that was designed to reduce the size of XML documents. One of the ways binary-encoded XML compresses data is by representing strings ("tokens") with fixed values.

In one implementation of binary-encoded xml, a mapping is established between character strings and replacement values, where the character strings are tag names, and the replacement values are numbers. Such mappings are referred to herein as "translation information".

Database servers that store XML data may include many mechanisms that allow for powerful and efficient ways to query large collections of XML documents. Database servers that store XML documents may be enhanced to efficiently perform XML operations using these mechanisms. A database server may maintain a "logical index", referred to herein as a XML index, that indexes a collection of XML. A logical index contains multiple structures that are cooperatively used to access a collection XML documents. According to an embodiment of the present invention, a logical index includes a path table, which contains information about the hierarchies of nodes in a collection XML documents and may contain the value of the nodes. Among the columns or attributes of the path table is a column that stores the path id of nodes.

When a database server receives a XML query, the database server may rewrite the query to refer to the underlying database structures that store the XML data. Such rewrites may include those described previously, those involving rewriting the query to refer to the data structures (e.g. path table) of the XML index.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
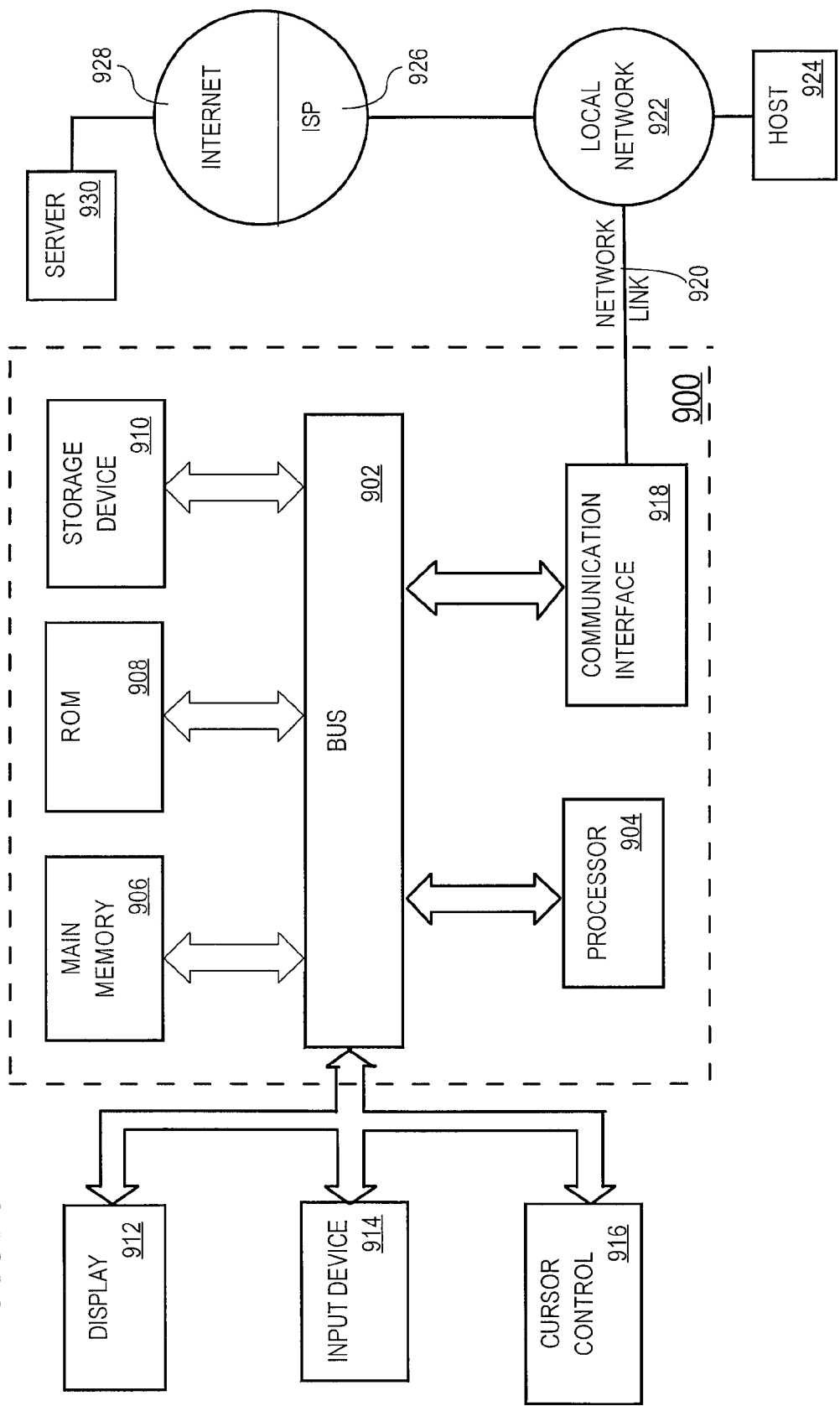
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
computing a query against a collection of XML documents stored in one or more tables of a database by, at least in part, executing a plurality of row sources of a query execution plan, each row source of said plurality of row sources generating one or more output rows;
wherein said plurality of row sources includes a path-based row source based on a path expression;
wherein said query comprises a row predicate condition that specifies one or more conditions that output rows of said path-based row source must satisfy;
wherein executing the path-based row source causes:
(a) identifying, based on said path expression, XML data from one or more input rows to said path-based row source;
(b) filtering, based on said row predicate condition, said XML data from said one or more input rows to said path-based row source;
(c) generating output rows that contain XML data based on said (a) identifying, based on said path expression, XML data from one or more input rows to said path-based row source and said (b) filtering, based on said row predicate condition, said XML data from said one or more input rows to said path-based row source.

2. The method of claim 1, wherein the query is an XQuery expression, and the path-based row source implements an XQuery FLOWR expression.

3. The method of claim 1, wherein the query is an SQL expression including XMLTABLE, and the path-based row source is an XPathTable.

4. The method of claim 1, wherein the query execution plan includes:
a first path-based row source generating a first set of output rows;
a second path-based row source generating a second set of output rows; and
computing the query further comprises:
determining that the second path-based row source does not operate on said first set of output rows;
determining that the second path-based row source generates all rows of the second set of output rows for each row in said first set of output rows; and
enabling a cache within the second path-based row source.

5. The method of claim 4, further comprising:
the first path-based row source generating a first row of said first set of output rows;
in response to the first path-based row source generating the first row of said first set of output rows, the second path-based row source generating data for all rows of said second set of output rows, and storing the data in the cache.

6. The method of claim 5, further comprising:
after the first path-based row source generating the first row, the first path-based row source generating a next row of said first set of output rows;
in response to the first path-based row source generating the next row, the second path-based row source creating a reorganized cache.

7. The method of claim 6, wherein the reorganized cache is a sorted buffer.

8. The method of claim 7, wherein the reorganized cache includes a hash table index, where in a key into the hash table index is based on a filter column.

9. The method of claim 8, wherein a value of the filter column is computed and stored in the cache as a scalar value.

10. The method of claim 4, wherein one or more tuning parameters define a maximum size of the cache.

11. The method of claim 10, further comprising:
determining whether a size of the cache has exceeded a size limit set in the one or more tuning parameters;
in response to determining that the size of the cache has exceeded the size limit, moving parts of the cache to temporary database tables.

12. A non-transitory computer-readable storage medium storing instructions which, when executed by one or more processors, cause the one or more processors to perform a method, comprising:
computing a query against a collection of XML documents stored in one or more tables of a database by, at least in part, executing a plurality of row sources of a query execution plan, each row source of said plurality of row sources generating one or more output rows;
wherein said plurality of row sources includes a path-based row source based on a path expression;
wherein said query comprises a row predicate condition that specifies one or more conditions that output rows of said path-based row source must satisfy;
wherein executing the path-based row source causes:
(a) identifying, based on said path expression, XML data from one or more input rows to said path-based row source;
(b) filtering, based on said row predicate condition, said XML data from said one or more input rows to said path-based row source;
(c) generating output rows that contain XML data based on said (a) identifying, based on said path expression, XML data from one or more input rows to said path-based row source and said (b) filtering, based on said row predicate condition, said XML data from said one or more input rows to said path-based row source.

13. The non-transitory computer-readable storage medium of claim 12, wherein the query is an XQuery expression, and the path-based row source implements an XQuery FLOWR expression.

14. The non-transitory computer-readable storage medium of claim 12, wherein the query is an SQL expression including XMLTABLE, and the path-based row source is an XPathTable.

15. The non-transitory computer-readable storage medium of claim 12, wherein the query execution plan includes:
   a first path-based row source generating a first set of output rows;
   a second path-based row source generating a second set of output rows; and
   computing the query further comprises:
      determining that the second path-based row source does not operate on said first set of output rows;
      determining that the second path-based row source generates all rows of the second set of output rows for each row in said first set of output rows; and
      enabling a cache within the second path-based row source.

16. The non-transitory computer-readable storage medium of claim 15, further comprising:
   the first path-based row source generating a first row of said first set of output rows;
   in response to the first path-based row source generating the first row of said first set of output rows, the second path-based row source generating data for all rows of said second set of output rows, and storing the data in the cache.

17. The non-transitory computer-readable storage medium of claim 16, further comprising:
   after the first path-based row source generating the first row, the first path-based row source generating a next row of said first set of output rows;
   in response to the first path-based row source generating the next row, the second path-based row source creating a reorganized cache.

18. The non-transitory computer-readable storage medium of claim 17, wherein the reorganized cache is a sorted buffer.

19. The non-transitory computer-readable storage medium of claim 18, wherein the reorganized cache includes a hash table index, where in a key into the hash table index is based on a filter column.

20. The non-transitory computer-readable storage medium of claim 19, wherein a value of the filter column is computed and stored in the cache as a scalar value.

21. The non-transitory computer-readable storage medium of claim 15, wherein one or more tuning parameters define a maximum size of the cache.

22. The non-transitory computer-readable storage medium of claim 21, further comprising:
   determining whether a size of the cache has exceeded a size limit set in the one or more tuning parameters;
   in response to determining that the size of the cache has exceeded the size limit, moving parts of the cache to temporary database tables.

* * * * *

UNITED STATES PATENT AND TRADEMARK OFFICE
CERTIFICATE OF CORRECTION

PATENT NO.        : 8,745,031 B2                                                         Page 1 of 2
APPLICATION NO.   : 12/474124
DATED             : June 3, 2014
INVENTOR(S)       : Sthanikam et al.

It is certified that error appears in the above-identified patent and that said Letters Patent is hereby corrected as shown below:

In the Drawings:

On sheet 6 of 9, in drawings, in Figure 6, under reference numeral 610, line 2, delete "FLOWR" and insert --FLWOR--, therefor.

On sheet 6 of 9, in drawings, in Figure 6, under reference numeral 630, line 2, delete "FLOWR" and insert --FLWOR--, therefor.

On sheet 6 of 9, in drawings, in Figure 6, under reference numeral 630, line 4, delete "FLOWR" and insert --FLWOR--, therefor.

In the Specification:

In column 1, line 35, delete "(extensible" and insert --(eXtensible--, therefor.

In column 1, line 47, delete "Store" and insert --Stored--, therefor.

In column 5, line 4, delete "FLOWR" and insert --FLWOR--, therefor.

In column 5, line 18, delete "FLOWR" and insert --FLWOR--, therefor.

In column 8, line 42, delete "FLOWR" and insert --FLWOR--, therefor.

In column 8, line 44, delete "FLOWR" and insert --FLWOR--, therefor.

In column 8, line 46, delete "FLOWR" and insert --FLWOR--, therefor.

In column 8, line 49, delete "FLOWR" and insert --FLWOR--, therefor.

Signed and Sealed this
Seventh Day of July, 2015

Michelle K. Lee
*Director of the United States Patent and Trademark Office*

CERTIFICATE OF CORRECTION (continued)
U.S. Pat. No. 8,745,031 B2

In the Claims:

In column 13, line 62, Claim 2, delete "FLOWR" and insert --FLWOR--, therefor.

In column 14, line 31, Claim 8, delete "where in" and insert --wherein--, therefor.

In column 15, line 5, Claim 13, delete "FLOWR" and insert --FLWOR--, therefor.

In column 16, line 16, Claim 19, delete "where in" and insert --wherein--, therefor.